(12) United States Patent
Chae

(10) Patent No.: US 11,630,285 B2
(45) Date of Patent: Apr. 18, 2023

(54) LENS MODULE

(71) Applicant: Samsung Electro-Mechanics Co., Ltd., Suwon-si (KR)

(72) Inventor: Kyu Min Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 343 days.

(21) Appl. No.: 16/872,765

(22) Filed: May 12, 2020

(65) Prior Publication Data

US 2020/0271900 A1   Aug. 27, 2020

Related U.S. Application Data

(63) Continuation of application No. 14/964,771, filed on Dec. 10, 2015, now Pat. No. 10,690,885.

(30) Foreign Application Priority Data

Dec. 10, 2014  (KR) .......................... 10-2014-0177447

(51) Int. Cl.
*G02B 13/00* (2006.01)

(52) U.S. Cl.
CPC ................. *G02B 13/0045* (2013.01)

(58) Field of Classification Search
USPC .......................................................... 359/714
See application file for complete search history.

(56) References Cited

U.S. PATENT DOCUMENTS

| 8,649,113 | B1 | 2/2014 | Tsai et al. |
| 2007/0188891 | A1 | 8/2007 | Shinohara |
| 2010/0149663 | A1 | 6/2010 | Heu |
| 2011/0134305 | A1 | 6/2011 | Sano et al. |
| 2011/0249348 | A1 | 10/2011 | Kubota et al. |
| 2012/0314304 | A1* | 12/2012 | Huang ............... G02B 13/0045 359/759 |
| 2013/0057967 | A1* | 3/2013 | Tang .................. G02B 13/0045 359/714 |
| 2013/0329306 | A1* | 12/2013 | Tsai ....................... G02B 13/18 359/713 |
| 2014/0029116 | A1 | 1/2014 | Tsai et al. |
| 2014/0049838 | A1 | 2/2014 | Tang et al. |

(Continued)

FOREIGN PATENT DOCUMENTS

| CN | 102317834 A | 1/2012 |
| CN | 102981247 A | 3/2013 |

(Continued)

OTHER PUBLICATIONS

Korean Office Action dated Dec. 3, 2018, in counterpart Korean Patent Application No. 10-2014-0177447 (6 pages in English, 6 pages in Korean).

(Continued)

*Primary Examiner* — Collin X Beatty
*Assistant Examiner* — Grant A Gagnon
(74) *Attorney, Agent, or Firm* — NSIP Law

(57) ABSTRACT

A lens module includes lenses sequentially arranged from an object side toward an image plane sensor and having respective refractive powers. A second lens of the lenses has a convex object-side surface and a convex image-side surface. A first lens and a third lens of the lenses are symmetrical to each other in relation to the second lens.

8 Claims, 16 Drawing Sheets

(56) References Cited

U.S. PATENT DOCUMENTS

| | | |
|---|---|---|
| 2014/0063622 A1 | 3/2014 | Tsai et al. |
| 2014/0204265 A1 | 7/2014 | Sunaga |
| 2014/0204480 A1 | 7/2014 | Jo et al. |

FOREIGN PATENT DOCUMENTS

| | | | | |
|---|---|---|---|---|
| CN | 202794675 U | | 3/2013 | |
| CN | 103941376 A | | 7/2014 | |
| CN | 105700121 A | * | 6/2016 | ......... G02B 13/0045 |
| JP | 2006-337793 A | | 12/2006 | |
| JP | 2010-282000 A | | 12/2010 | |
| KR | 10-2011-0042382 A | | 4/2011 | |

OTHER PUBLICATIONS

Chinese Office Action dated Feb. 19, 2019, in counterpart Chinese Patent Application No. 201510917175.3 (14 pages in English, 9 pages in Chinese).
Taiwanese Office Action dated Feb. 21, 2019, in counterpart Taiwanese Patent Application No. 104140875 (4 pages in English, 4 pages in Chinese).
U.S. Appl. No. 14/964,771, filed Dec. 10, 2015, Kyu Min Chae, Samsung Electro-Mechanics Co., Ltd.
Chinese Office Action dated Jul. 5, 2021, in counterpart Chinese Patent Application No. 202010002347.5 (3 pages in English and 5 pages in Chinese).

* cited by examiner

| SURFACE NUMBER | CURVATURE RADIUS | THICKNESS /DISTANCE | REFRACTIVE INDEX | ABBE'S NUMBER | REMARK |
|---|---|---|---|---|---|
| OBJECT | Infinity | Infinity | | | |
| 1 | 4.073 | 0.280 | 1.620 | 25.6 | FIRST LENS |
| 2 | 1.790 | 0.080 | | | |
| 3 | 1.256 | 0.501 | 1.537 | 56.3 | SECOND LENS |
| 4 | -3.261 | 0.585 | | | |
| 5 | -1.29097 | 0.625 | 1.537 | 56.3 | THIRD LENS |
| 6 | -1.075 | 0.080 | | | |
| 7 | -3.886 | 0.300 | 1.620 | 25.6 | FOURTH LENS |
| 8 | -100.000 | 0.080 | | | |
| 9 | 1.903 | 0.737 | 1.537 | 56.3 | FIFTH LENS |
| 10 | 1.170 | 0.373 | | | |
| 11 | Infinity | 0.373 | 1.517 | 64.2 | FILTER |
| 12 | Infinity | 0.300 | | | |
| IMAGE PLANE | Infinity | - | - | - | |

FIG. 3

| Ex.1 | CONIC (K) | 4th ORDER(A) | 6th ORDER (B) | 8th ORDER(C) | 10th ORDER(D) | 12th ORDER(E) | 14th ORDER(F) |
|---|---|---|---|---|---|---|---|
| 1 | 0.00000 | -0.04976 | 0.08533 | -0.09769 | 0.01943 | 0.00000 | 0.00000 |
| 2 | 0.00000 | -0.15669 | 0.59340 | -0.82364 | 0.76601 | 0.00000 | 0.00000 |
| 3 | 0.00000 | -0.21004 | 0.43036 | -0.71844 | 0.58766 | 0.00000 | 0.00000 |
| 4 | 0.00000 | -0.09187 | -0.08339 | 0.15858 | -0.15978 | 0.00000 | 0.00000 |
| 5 | 0.00000 | -0.07189 | -0.18447 | 0.62435 | -0.51258 | 0.00000 | 0.00000 |
| 6 | 0.00000 | -0.19880 | 0.59061 | -0.73513 | 0.49018 | 0.00000 | 0.00000 |
| 7 | 0.00000 | -0.18583 | 0.16708 | -0.32760 | 0.06867 | 0.00000 | 0.00000 |
| 8 | 0.00000 | -0.10789 | 0.06517 | -0.04137 | 0.01330 | 0.00000 | 0.00000 |
| 9 | 0.00000 | -0.45017 | 0.35460 | -0.15323 | 0.03299 | -0.00308 | 0.00000 |
| 10 | -1.00000 | -0.36714 | 0.23764 | -0.11668 | 0.03646 | -0.00628 | 0.00044 |

FIG. 4

| SURFACE NUMBER | CURVATURE RADIUS | THICKNESS /DISTANCE | REFRACTIVE INDEX | ABBE'S NUMBER | REMARK |
|---|---|---|---|---|---|
| OBJECT | Infinity | Infinity | | | |
| 1 | 2.289 | 0.280 | 1.620 | 25.6 | FIRST LENS |
| 2 | 1.336 | 0.097 | | | |
| 3 | 1.220 | 0.718 | 1.537 | 56.3 | SECOND LENS |
| 4 | -5.184 | 0.703 | | | |
| 5 | -1.343 | 0.402 | 1.537 | 56.3 | THIRD LENS |
| 6 | -1.282 | 0.080 | | | |
| 7 | -10.034 | 0.564 | 1.620 | 25.6 | FOURTH LENS |
| 8 | 7.038 | 0.256 | | | |
| 9 | 2.771 | 0.820 | 1.537 | 56.3 | FIFTH LENS |
| 10 | 1.593 | 0.373 | | | |
| 11 | Infinity | 0.300 | 1.517 | 64.2 | FILTER |
| 12 | Infinity | 0.133 | | | |
| IMAGE PLANE | Infinity | - | - | - | |

FIG. 7

| Ex.2 | CONIC (K) | 4th ORDER (A) | 6th ORDER (B) | 8th ORDER (C) | 10th ORDER (D) | 12th ORDER (E) | 14th ORDER (F) |
|---|---|---|---|---|---|---|---|
| 1 | 0.00000 | -0.01698 | 0.03394 | -0.01783 | -0.00835 | 0.00000 | 0.00000 |
| 2 | 0.00000 | -0.07189 | 0.17317 | -0.04604 | -0.00110 | 0.00000 | 0.00000 |
| 3 | 0.00000 | -0.10716 | 0.07428 | 0.00295 | -0.08579 | 0.00000 | 0.00000 |
| 4 | 0.00000 | -0.06532 | -0.06159 | 0.09498 | -0.11157 | 0.00000 | 0.00000 |
| 5 | 0.00000 | 0.05107 | -0.12642 | 0.44995 | -0.58866 | 0.00000 | 0.00000 |
| 6 | 0.00000 | -0.09217 | 0.18099 | -0.05737 | -0.10011 | 0.00000 | 0.00000 |
| 7 | 0.00000 | -0.30583 | 0.08761 | -0.02357 | -0.19156 | 0.00000 | 0.00000 |
| 8 | 0.00000 | -0.26881 | 0.17230 | -0.07909 | 0.01923 | 0.00000 | 0.00000 |
| 9 | 0.00000 | -0.33574 | 0.18944 | -0.04920 | 0.00462 | -0.00002 | 0.00000 |
| 10 | -1.00000 | -0.22917 | 0.11714 | -0.04475 | 0.01068 | -0.00139 | 0.00007 |

FIG. 8

| SURFACE NUMBER | CURVATURE RADIUS | THICKNESS /DISTANCE | REFRACTIVE INDEX | ABBE'S NUMBER | REMARK |
|---|---|---|---|---|---|
| OBJECT | Infinity | Infinity | | | |
| 1 | 3.092 | 0.280 | 1.620 | 25.6 | FIRST LENS |
| 2 | 1.617 | 0.100 | | | |
| 3 | 1.238 | 0.582 | 1.537 | 56.3 | SECOND LENS |
| 4 | -5.569 | 0.758 | | | |
| 5 | -1.259 | 0.358 | 1.537 | 56.3 | THIRD LENS |
| 6 | -1.165 | 0.127 | | | |
| 7 | -2.833 | 0.477 | 1.620 | 25.6 | FOURTH LENS |
| 8 | -100.000 | 0.080 | | | |
| 9 | 1.656 | 0.820 | 1.537 | 56.3 | FIFTH LENS |
| 10 | 1.399 | 0.373 | | | |
| 11 | Infinity | 0.300 | 1.517 | 64.2 | FILTER |
| 12 | Infinity | 0.368 | | | |
| IMAGE PLANE | | | | | |

FIG. 11

| Ex.3 | CONIC (K) | 4th ORDER(A) | 6th ORDER(B) | 8th ORDER(C) | 10th ORDER(D) | 12th ORDER(E) | 14th ORDER(F) |
|---|---|---|---|---|---|---|---|
| 1 | 0.00000 | -0.04034 | 0.07437 | -0.04329 | -0.00055 | 0.00000 | 0.00000 |
| 2 | 0.00000 | -0.13775 | 0.38673 | -0.31002 | 0.20790 | 0.00000 | 0.00000 |
| 3 | 0.00000 | -0.16527 | 0.26039 | -0.29601 | 0.19425 | 0.00000 | 0.00000 |
| 4 | 0.00000 | -0.06520 | -0.04997 | 0.06478 | -0.00882 | 0.00000 | 0.00000 |
| 5 | 0.00000 | -0.07503 | 0.06162 | 0.23134 | -0.27235 | 0.00000 | 0.00000 |
| 6 | 0.00000 | -0.09084 | 0.19744 | -0.06711 | 0.07566 | 0.00000 | 0.00000 |
| 7 | 0.00000 | -0.01497 | -0.23796 | 0.18550 | -0.13579 | 0.00000 | 0.00000 |
| 8 | 0.00000 | -0.16430 | 0.12307 | -0.06774 | 0.01734 | 0.00000 | 0.00000 |
| 9 | 0.00000 | -0.48082 | 0.36556 | -0.18649 | 0.05152 | -0.00660 | 0.00000 |
| 10 | -1.00000 | -0.27013 | 0.13980 | -0.05371 | 0.01306 | -0.00187 | 0.00012 |

FIG. 12

| SURFACE NUMBER | CURVATURE RADIUS | THICKNESS /DISTANCE | REFRACTIVE INDEX | ABBE'S NUMBER | REMARK |
|---|---|---|---|---|---|
| OBJECT | Infinity | Infinity | | | |
| 1 | 1.911 | 0.280 | 1.620 | 25.6 | FIRST LENS |
| 2 | 1.159 | 0.080 | | | |
| 3 | 0.961 | 0.650 | 1.537 | 56.3 | SECOND LENS |
| 4 | 20.602 | 0.598 | | | |
| 5 | −1.359 | 0.352 | 1.537 | 56.3 | THIRD LENS |
| 6 | −1.113 | 0.080 | | | |
| 7 | −2.812 | 0.552 | 1.620 | 25.6 | FOURTH LENS |
| 8 | −16.643 | 0.185 | | | |
| 9 | 2.030 | 0.769 | 1.537 | 56.3 | FIFTH LENS |
| 10 | 1.383 | 0.373 | | | |
| 11 | Infinity | 0.300 | 1.517 | 64.2 | FILTER |
| 12 | Infinity | 0.206 | | | |
| IMAGE PLANE | | | | | |

FIG. 15

| Ex.4 | CONIC (K) | 4th ORDER(A) | 6th ORDER(B) | 8th ORDER(C) | 10th ORDER(D) | 12th ORDER(E) | 14th ORDER(F) |
|---|---|---|---|---|---|---|---|
| 1 | 0.00000 | -0.01385 | 0.07353 | -0.03660 | 0.00068 | 0.00000 | 0.00000 |
| 2 | 0.00000 | -0.18022 | 0.55860 | -0.57720 | 0.43490 | 0.00000 | 0.00000 |
| 3 | 0.00000 | -0.22854 | 0.47944 | -0.70808 | 0.55367 | 0.00000 | 0.00000 |
| 4 | 0.00000 | -0.04486 | 0.01471 | -0.11508 | 0.45689 | 0.00000 | 0.00000 |
| 5 | 0.00000 | -0.21709 | 0.08784 | 0.03086 | -0.62385 | 0.00000 | 0.00000 |
| 6 | 0.00000 | -0.12075 | 0.45183 | -0.76571 | 0.65082 | 0.00000 | 0.00000 |
| 7 | 0.00000 | -0.08283 | 0.01677 | -0.21229 | 0.02135 | 0.00000 | 0.00000 |
| 8 | 0.00000 | -0.19007 | 0.14428 | -0.08594 | 0.02276 | 0.00000 | 0.00000 |
| 9 | 0.00000 | -0.41542 | 0.27173 | -0.09609 | 0.01778 | -0.00141 | 0.00000 |
| 10 | -1.00000 | -0.27923 | 0.15186 | -0.06339 | 0.01713 | -0.00255 | 0.00016 |

FIG. 16

LENS MODULE

CROSS-REFERENCE TO RELATED APPLICATIONS

This application is a continuation of U.S. patent application Ser. No. 14/964,771 filed on Dec. 10, 2015, now U.S. Pat. No. 10,690,885 issued on Jun. 23, 2020, and claims the benefit under 35 USC 119(a) of Korean Patent Application No. 10-2014-0177447 filed on Dec. 10, 2014, in the Korean Intellectual Property Office, the entire disclosures of which are incorporated herein by reference for all purposes.

BACKGROUND

1. Field

The following description relates to a lens module having an optical system including five lenses.

2. Description of Related Art

A lens module mounted in a camera of a mobile communications terminal commonly includes a plurality of lenses. For example, the lens module includes five lenses as a high-resolution optical system.

However, when the high-resolution optical system is configured using a plurality of lenses as described above, a length (a distance from an object-side surface of a first lens to an image sensor) of the optical system increases. In this case, it is difficult to install the lens module in a slim mobile communications terminal. Therefore, a demand exists to develop a lens module having an optical system of decreased length.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a lens module, including: lenses sequentially arranged from an object side toward an image plane sensor and including refractive power, respectively, wherein a second lens of the lenses may have a convex object-side surface and a convex image-side surface, and a first lens and a third lens of the lenses are symmetrical to each other in relation to the second lens.

The first lens may have a meniscus shape.
The first lens may have a convex object-side surface.
The first lens may have a concave image-side surface.
The fourth lens may have a concave object-side surface.
At least one of an object-side surface and an image-side surface of the fourth lens may be concave.
The fifth lens may have a convex object-side surface.
The fifth lens may have a concave image-side surface.
The lens module may further include a stop disposed between the second lens and the third lens.

In accordance with an embodiment, there is provided a lens module, including: a first lens with a first refractive power; a second lens with a second refractive power; a third lens with the second refractive power; a fourth lens with the first refractive power; and a fifth lens with the first refractive power and including an inflection point on an image-side surface, wherein the first to fifth lenses are sequentially arranged from an object side to an image side.

The first refractive power may be a negative refractive power.

The second refractive power may be a positive refractive power.

The lens module may satisfy 20<|V1−V2| in which V1 is an Abbe number of the first lens and V2 may be an Abbe number of the second lens.

The lens module may satisfy 20<V3−V4 in which V3 is an Abbe number of the third lens and V4 is an Abbe number of the fourth lens.

The lens module may satisfy 1.0<|(1/f1+1/f2)/(1/f3+1/f4+1/f5)|<4.0 in which f1 is a focal length of the first lens, f2 is a focal length of the second lens, f3 is a focal length of the third lens, f4 is a focal length of the fourth lens, and f5 is a focal length of the fifth lens.

The lens module may satisfy 1.0<|(r1+r2)/(r5+r6)|<3.0 in which r1 is a radius of curvature of an object-side surface of the first lens, r2 is a radius of curvature of an image-side surface of the first lens, r5 is a radius of curvature of an object-side surface of the third lens, and r6 is a radius of curvature of an image-side surface of the third lens.

In accordance with an embodiment, there is provided a lens module, including: lenses sequentially arranged from an object side toward an image plane sensor and including refractive power, respectively, wherein a refractive power of a first lens of the lenses is stronger than a refractive power of a fourth lens of the lenses, and the fourth lens includes a shape substantially symmetrical to a shape of the first lens.

A second lens, a third lens, and a fifth lens of the lenses may have a positive refractive power.

A second lens of the lenses may have a strongest refractive power of the lenses and a fifth lens may have a weakest refractive power of the lenses.

An object-side surface of the first lens is convex and an image-side surface of the fourth lens may be substantially convex.

An image-side surface of the first lens is concave and an object-side surface of the fourth lens may be concave.

A third lens of the lenses may have the same refractive power as a second lens of the lenses.

The first lens may have a meniscus shape convex toward an object and a third lens of the lenses may have a meniscus shape convex toward an image plane.

The first lens may have a meniscus shape convex toward an image plane and a third lens of the lenses may have a meniscus shape convex toward an object.

An object-side surface of a third lens of the lenses may be substantially concave in a paraxial region and flattens at an edge portion thereof.

The first lens and the fourth lens may be formed of a material including a refractive index of at least 1.60.

The first lens and the fourth lens may include an Abbe number of 30 or less.

The first lens and a second lens of the lenses may have a refractive power symmetrical with a third lens of the lenses and the fourth lens.

The first and second lenses may have a negative refractive power and a positive refractive power, respectively, and the third and fourth lenses may have a positive refractive power and a negative refractive power, respectively.

The first lens and a second lens of the lenses may have symmetrical shapes with a third lens of the lenses and the fourth lens, respectively.

The first and second lenses may have a meniscus shape convex toward an object, and the third and fourth lenses have a meniscus shape convex toward an image plane.

Abbe numbers of the first and second lenses may be symmetrical with Abbe numbers of the third and fourth lenses.

In accordance with an embodiment, there is provided a lens module, including: lenses sequentially arranged from an object side toward an image plane sensor and including refractive power, respectively, wherein a first lens, a fourth lens, and a fifth lens of the lenses have a same refractive power, and wherein the first lens may have a strongest refractive power among the lenses and the fifth lens may have a weakest refractive power among the lenses, and the fourth lens includes a shape substantially symmetrical and opposite to a shape of the first lens.

The first lens, the fourth lens, and the fifth lens may have a negative refractive power.

The first lens may have a meniscus shape convex toward an object, and the fourth lens may have a meniscus shape convex toward an image plane.

A second lens of the lenses may have a same refractive power as that of a third lens lenses, and the second lens may have an opposite shape to that of the third lens.

The second lens may have a meniscus shape convex toward an object, and the third lens may have a meniscus shape convex toward an image plane.

Other features and aspects will be apparent from the following detailed description, the drawings, and the claims.

BRIEF DESCRIPTION OF DRAWINGS

FIG. 3 is a table illustrating characteristics of lenses illustrated in FIG. 1.

FIG. 4 is a table representing aspheric coefficients of the lens module illustrated in FIG. 1.

FIG. 7 is a table illustrating the characteristics of the lenses illustrated in FIG. 5.

FIG. 8 is a table representing aspheric coefficients of the lens module of FIG. 5.

FIG. 11 is a table illustrating the characteristics of lenses illustrated in FIG. 9.

FIG. 12 is a table representing aspheric coefficients of the lens module of FIG. 9.

FIG. 15 is a table illustrating the characteristics of lenses illustrated in FIG. 13.

FIG. 16 is a table representing aspheric coefficients of the lens module of FIG. 13.

Figure 1:
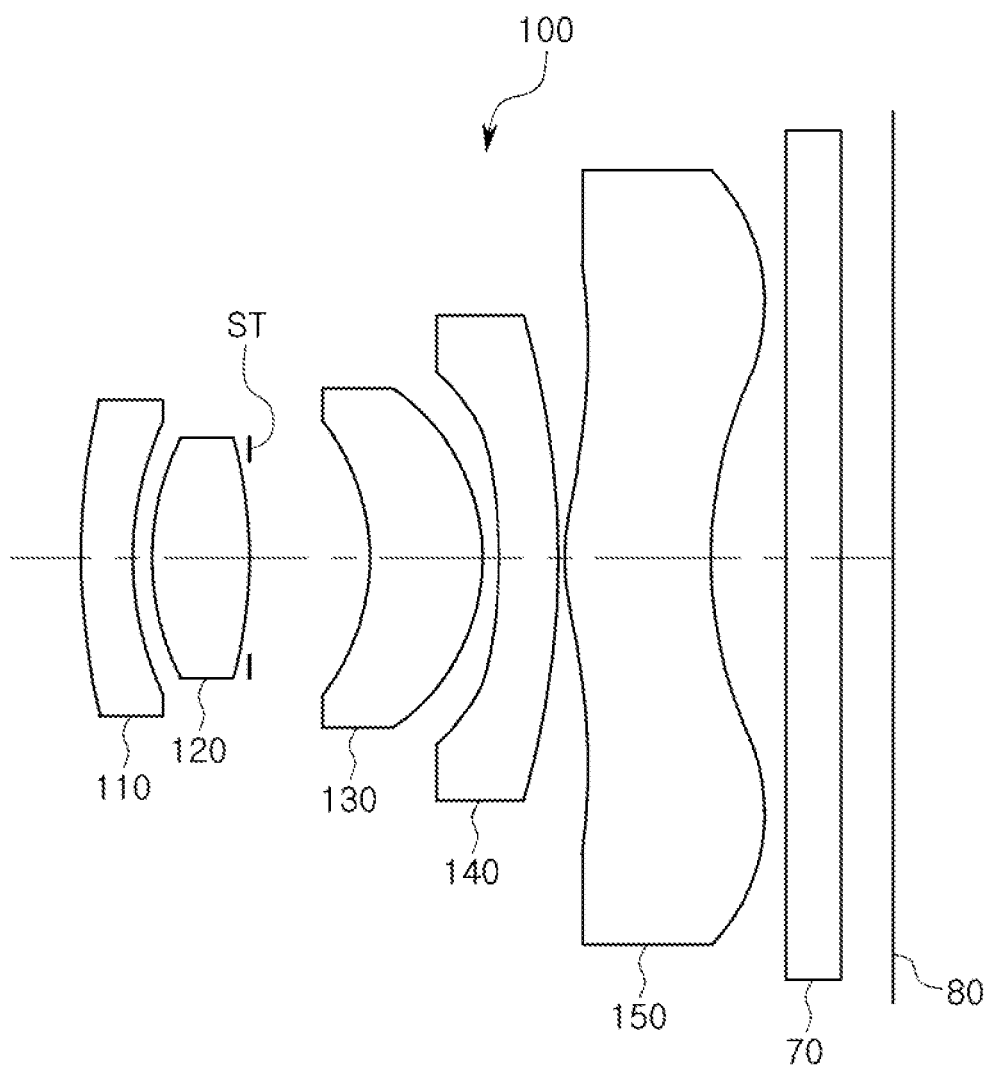
FIG. 1 is a view of a lens module, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc., may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings of the various embodiments.

In one illustrative example, a first lens refers to a lens closest to an object or a subject from which an image is captured. A fifth lens is a lens closest to an image plane or an image sensor. In addition, a front portion is a portion of a lens module close to the object or the subject, and a rear portion is a portion of a lens module close to the image plane or the image sensor. In addition, a first surface of each lens refers to a surface of the lens closest to the object or the subject, and a second surface of each lens refers to a surface of the lens closest to the image plane or the image sensor. All of radii of curvatures, thicknesses, optical axis distances from a first surface of the first lens to the image plane (OALs), distances on the optical axis between the stop and the image sensor (SLs), image heights (ImgHs or IMG HTs), and back focus lengths (BFLs) of the lenses, an overall focal length of an optical system, and a focal length of each lens are stated in millimeters (mm). Additionally, thicknesses of lenses, gaps between the lenses, OALs, and SLs are distances measured based on an optical axis of the lenses.

Further, concerning lens shapes, a statement that a surface of a lens is convex means that an optical axis portion of a corresponding surface is convex. A statement that a surface of a lens is concave means that an optical axis portion of a corresponding surface is concave. Therefore, although it may be stated that one surface of a lens is convex, an edge portion of the lens may be concave. Likewise, although it may be stated that one surface of a lens is concave, an edge portion of the lens may be convex. In other words, a paraxial region of a lens may be convex, while the remaining portion of the lens outside the paraxial region may be convex, concave, or flat. Further, a paraxial region of a lens may be concave, while the remaining portion of the lens outside the paraxial region may be convex, concave, or flat.

A lens module includes an optical system including a plurality of lenses. In one embodiment, the optical system of the lens module includes five lenses having refractive power. However, the lens module is not limited to only including five lenses. The lens module may include from four lenses up to six lenses without departing from the scope of the embodiments herein described. In accordance with an illustrative example, the embodiments described of the optical system include five lenses with a particular refractive power. However, a person of ordinary skill in the relevant art will appreciate that the number of lenses in the optical system may vary, for example, between two to six lenses, while achieving the various results and benefits described hereinbelow. Also, although each lens is described with a particular refractive power, a different refractive power for at least one of the lenses may be used to achieve the intended result.

Furthermore, the lens module includes other structural components that do not have refractive power, such as, the lens module includes a stop controlling an amount of light. As another example, the lens module may further include an infrared cut-off filter blocking infrared light. As another example, the lens module may further include an image sensor, for instance, an imaging device, to convert an image of a subject incident thereon through the optical system into electrical signals. As another example, the lens module may further include a gap maintaining member to adjust a gap between lenses. In one illustrative embodiment, the gap maintaining member adjusts each lens to be at a distance from each other and the filter. However, in an alternative embodiment, the gap maintaining member may adjust each lens so that at least two of the lenses are in contact with each other, while the other lenses and the filter have a predetermined gap there between. In a further embodiment, the gap maintaining member may adjust each lens so that at least two of the lenses are in contact with each other, while the other lenses have a gap there between and at least one of the lenses is in contact with the filter.

First to fifth lenses are formed using a material having a refractive index different from that of air. For example, the first to fifth lenses are formed of plastic or glass. In an example, at least one of the first to fifth lenses has an aspherical surface shape. In another example, only the fifth lens of the first to fifth lenses has the aspherical surface shape. Further, at least one surface of each of the first to fifth lenses may be aspherical. For instance, the aspherical surface of each lens is represented by the following Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In an example, c is an inverse of a radius of curvature of a corresponding lens, K is a conic constant, and r refers to a distance from a certain point on an aspheric surface to an optical axis in a direction perpendicular to the optical axis. In addition, constants A, B, C, D, E, F, G, H, and J are respectively 4th, 6th, 8th, 10th, 12th, 14th, 16th, 18th, and 20th order aspheric coefficients. In addition, Z is a distance between the certain point on the aspheric surface at the distance r and a tangential plane meeting the apex of the aspheric surface of the lens.

The optical system configuring the lens module has a field of view (FOV) of 60 degrees or more. Therefore, the lens module, according to an embodiment, may easily capture an image is observable at a wide field of view.

The lens module includes first to fifth lenses having refractive power. The lens module also includes a filter, a stop, and an image sensor. Hereinafter, structural components included in the lens module will be described.

Each of the first through fifth lenses has a refractive power, either negative or positive. For instance, in one configuration, the first lens has a first refractive power. For example, the first lens has a negative refractive power.

The first lens has a meniscus shape. For example, a first surface or an object-side surface of the first lens is convex, and a second surface or an image-side surface of the first lens is concave.

The first lens has an aspheric surface. For example, two surfaces of the first lens are aspheric. The first lens is formed of a material having relatively high light transmissivity and excellent workability. For example, the first lens is formed of plastic or other organic polymers. However, a material of the first lens is not limited to plastic. For example, the first lens may be formed of glass.

The first lens is formed of a material having a relatively high refractive index. For example, the first lens is formed of a material having a refractive index of 1.60 or more. In one example, the first lens has an Abbe number of 30 or less. The first lens formed of this material easily refracts light while having a relatively small curvature. Therefore, the first lens formed of this material is easily manufactured and is advantageous in terms of lowering a defect rate depending on manufacturing tolerance. In addition, the first lens formed of this material enables a distance between lenses to be decreased, providing an advantage for miniaturizing the lens module.

The second lens has a second refractive power. For example, the second lens has a refractive power opposite that of the first lens. For example, the second lens has a positive refractive power.

The second lens has at least one convex surface. For example, the first surface of the second lens is convex. As another example, the second surface of the second lens is convex. As another example, the first and second surfaces of the second lens are both convex.

The second lens has an aspheric surface. For example, two opposing surfaces of the second lens are aspheric. The second lens is formed of a material having relatively high light transmissivity and excellent workability. For example, the second lens is formed of plastic or other organic polymers. However, the material of the second lens is not limited to plastic. For example, the second lens may be formed of glass.

A third lens has a second refractive power. For example, the third lens has the same refractive power as the second lens. For example, when the second lens has positive refractive power, the third lens has a positive refractive power. As another example, when the second lens has negative refractive power, the third lens has a negative refractive power. However, the configuration of the third lens is not limited to have the same refractive power as the second lens. For instance, in an alternative configuration, the third lens has a refractive power independent of the refractive power of the second lens. The third lens may have a refractive power to be the same as the refractive power as a fourth lens, to be later described, or the first lens.

The third lens has a shape symmetrical with that of the first lens. For example, when the first lens has a meniscus shape convex toward an object, the third lens has a meniscus shape convex toward an image plane. As another example, when the first lens has a meniscus shape convex toward an image plane, the third lens has a meniscus shape convex toward an object. In one example, an object-side surface of the third lens is concave substantially in a paraxial region and flattens at an edge portion thereof. In this example, an image-side surface of the third lens is convex in a paraxial region.

The third lens has an aspheric surface. For example, two opposing surfaces of the third lens are aspheric. The third lens is formed of a material having relatively high light transmissivity and excellent workability. For example, the third lens is formed of plastic or other organic polymers. However, the material of the third lens is not limited to plastic. For example, the third lens may be formed of glass.

A fourth lens has a first refractive power. For example, the fourth lens has the same refractive power as the first lens. For example, when the first lens has a positive refractive power, the fourth lens has a positive refractive power. As another example, when the first lens has a negative refractive power, the fourth lens has a negative refractive power. However, the configuration of the fourth lens is not limited to have the same refractive power as the first lens. For instance, in an alternative configuration, the fourth lens has a refractive power independent of the refractive power of the first lens. The fourth lens may have a refractive power to be the same as the refractive power as a fifth lens, to be later described, or the third lens.

The fourth lens has a shape substantially symmetrical to that of the first lens. For example, when an object-side surface of the first lens is convex, the image-side surface of the fourth lens is substantially convex. As another example, when the image-side surface of the first lens is concave, the object-side surface of the fourth lens is concave. In one example, an object-side surface of the fourth lens is concave substantially in a paraxial region and flattens at an edge portion thereof. In this example, an image-side surface of the fourth lens is convex in a paraxial region.

The fourth lens has an aspheric surface. For example, two opposing surfaces of the fourth lens are aspheric. The fourth lens is formed of a material having relatively high light transmissivity and excellent workability. For example, the fourth lens may be formed of plastic or other organic polymer. However, the material of the fourth lens is not limited to plastic. For example, the fourth lens may be formed of glass.

The fourth lens is formed of the same material as or a material similar to that of the first lens. For example, the fourth lens is formed of a material having a refractive index of 1.60 or more like the first lens. In one example, the fourth lens has an Abbe number of 30 or less. The fourth lens formed of this material easily refracts light, even while having a relatively small curvature. Therefore, the fourth lens formed of this material is easily manufactured and is advantageous in terms of lowering a defect rate depending on manufacturing tolerance. In addition, the fourth lens formed of this material decreases a distance between lenses, thus, allowing a miniaturization of the lens module.

A fifth lens has a first refractive power. For example, the fifth lens has substantially the same refractive power as the first lens. For example, when the first lens has positive refractive power, the fifth lens has a positive refractive power. As another example, when the first lens has negative refractive power, the fifth lens has a negative refractive power. However, the configuration of the fifth lens is not limited to have the same refractive power as the first lens. For instance, in an alternative configuration, the fifth lens has a refractive power independent of the refractive power of the first lens. The fifth lens may have a refractive power to be the same as the refractive power as the second, the third, or the fourth lenses.

The fifth lens is convex toward an object. For example, the first surface of the fifth lens is convex and the second surface thereof is concave.

The fifth lens is shaped to include an inflection point. For example, one or more inflection points are formed on an object-side surface of the fifth lens. As another example, one or more inflection points are formed on an image-side surface of the fifth lens. The object-side surface of the fifth lens, configured as described above, has a shape in which a convex portion and a concave portion are alternately formed. Similarly, the image-side surface of the fifth lens is concave in a paraxial portion, for example, at the center of the lens, while an edge portion thereof is convex. In an embodiment, the image-side surface of the fifth lens is concave in a paraxial region and gradually curves to be convex towards edge portions thereof. In an embodiment, the object-side surface of the fifth lens is convex is the paraxial region and gradually curves to be concave outside the paraxial region and flattens at edge portions thereof.

The fifth lens has an aspheric surface. For example, two opposing surfaces of the fifth lens are aspheric. The fifth lens is formed of a material having relatively high light transmissivity and excellent workability. For example, the fifth lens may be formed of plastic or other organic polymer. However, the material of the fifth lens is not limited to plastic. For example, the fifth lens may be formed of glass.

The filter is disposed between the fifth lens and an image sensor. The filter blocks a specific wavelength of incident light. For example, the filter is an infrared cut-off filter for blocking infrared rays. The filter is formed of plastic or glass. For example, the filter has an Abbe number of 60 or more.

In one configuration, the stop is disposed between the second lens and the third lens. For example, the stop may be disposed between an image-side surface of the second lens and an object-side surface of the third lens. In alternative configurations, the stop may be disposed between any other of the first through five lenses illustrated in FIG. 1.

The image sensor is configured to realize high resolution of 1300 megapixels. For example, a unit size of the pixels configuring the image sensor may be 1.12 µm or less.

The lens module has a relatively wide field of view. For example, the optical system of the lens module has a field of view of about 60 degrees or more. In addition, the lens module has a relatively short total track length (TTL). For example, the TTL, which is an overall length or a distance from the object-side surface of the first lens to the image sensor of the optical system configuring the lens module, is 4.80 mm or less. Therefore, the lens module, according to an embodiment, enables miniaturization thereof.

The lens module is configured in such a way that the first to fourth lenses are approximately symmetrical to each other in relation to the stop. For example, the first and second lenses have a refractive power symmetrical with the third and fourth lenses. For example, when the first and second lenses have negative and positive refractive power, respectively, the third and fourth lenses have positive and negative refractive power, respectively. As another example, the first and second lenses have symmetrical shapes with the third and fourth lenses, respectively. For example, when the first and second lenses have a meniscus shape convex toward an object, the third and fourth lenses have a meniscus shape convex toward an image plane. This configuration of the first to fourth lenses is advantageous in terms of compensating for a distortion aberration and an astigmatic aberration. As another example, Abbe numbers of the first and second lenses are distributed to be symmetrical with Abbe numbers of the third and fourth lenses. For example, the first lens have approximately the same Abbe number as the fourth lens, and the second lens have approximately the same Abbe number as third lens. The distribution characteristics of Abbe numbers of the first to fourth lenses are advantageous in terms of compensating for color aberration.

The lens module satisfies the following conditional formula 1.

$$20 < |V1 - V2| \qquad \text{(Conditional Formula 1)}$$

In the above conditional formula 1, V1 is an Abbe number of the first lens, and V2 is an Abbe number of the second lens.

The above conditional formula 1 is a condition to compensate for color aberration by the first and second lenses. For example, a combination of the first and second lenses which satisfy the above conditional formula 1 effectively compensates for color aberration.

In addition, the lens module satisfies the following conditional formula 2.

$$20 < V3 - V4 \qquad \text{(Conditional Formula 2)}$$

In the above conditional formula 2, V3 is an Abbe number of the third lens, and V4 is an Abbe number of the fourth lens.

The above conditional formula 2 is a condition to compensate for color aberration by the third and fourth lenses. For example, a combination of the third and fourth lenses that satisfy the above conditional formula 2 effectively compensates for color aberration.

In addition, the lens module satisfies the following conditional formula 3.

$$1.0 < |(1/f1 + 1/f2)/(1/f3 + 1/f4 + 1/f5)| < 4.0 \qquad \text{(Conditional Formula 3)}$$

In the above conditional formula 3, f1 is a focal length of the first lens, f2 is a focal length of the second lens, f3 is a focal length of the third lens, f4 is a focal length of the fourth lens, and f5 is a focal length of the fifth lens.

The above conditional formula 3 is a condition to obtain improved distribution of refractive power of the first to fifth lenses. For example, an optical system that satisfies the above conditional formula 3 may be easily manufactured.

In addition, the lens module may satisfy the following conditional formula 4.

$$1.0 < |(r1 + r2)/(r5 + r6)| < 3.0 \qquad \text{(Conditional Formula 4)}$$

In the above conditional formula 4, r1 is a radius of curvature of an object-side surface of the first lens, r2 is a radius of curvature of an image-side surface of the first lens, r5 is a radius of curvature an object-side surface of the third lens, and r6 is a radius of curvature of an image-side surface of the third lens.

The above conditional formula 4 is a condition to improve shapes of the first and third lenses.

In addition, the lens module satisfies the following conditional formula 5.

$$0.7 < d3/d4 < 1.2 \qquad \text{(Conditional Formula 5)}$$

In the above conditional formula 5, d3 is a thickness of the second lens and d4 is a distance from an image-side surface of the second lens to an object-side surface of the third lens.

A lens module, according to a first embodiment, will be described with reference to FIG. 1.

A lens module 100 includes an optical system including a first lens 110, a second lens 120, a third lens 130, a fourth lens 140, and a fifth lens 150. In addition, the lens module 100 includes an infrared cut-off filter 70 and an image sensor 80. In addition, the lens module 100 also includes a stop (ST). For example, the stop is disposed between the second lens and the third lens.

In an embodiment, the first lens 110 has a negative refractive power, and an object-side surface thereof is convex and an image-side surface thereof is concave. The second lens 120 has a positive refractive power, and two opposing surfaces thereof are convex. The third lens 130 has a positive refractive power, and an object-side surface thereof is concave and an image-side surface thereof is convex. The fourth lens 140 has a negative refractive power, and an object-side surface thereof is concave and an image-side surface thereof is convex. The fifth lens 150 has a negative refractive power, and an object-side surface thereof is convex and an image-side surface thereof is concave. In addition, one or more inflection points are formed on each of the object-side surface and the image-side surface of the fifth lens.

In an embodiment, all of the first lens 110, the fourth lens 140, and the fifth lens 150 have a negative refractive power, as described above. Among these lenses, the fifth lens 150 has the weakest refractive power, and the first lens 110 has the strongest refractive power. However, a person of skill in the art will appreciate that in alternative embodiments, at least one of the first lens 110, the fourth lens 140, and the fifth lens 150 has a negative refractive power. Also, the refractive power of the first lens 110 may be weaker than the refractive power of the fourth lens 140. Further, the refractive power of the first lens 110 may be weaker than the refractive power of the fifth lens 150.

Figure 2:
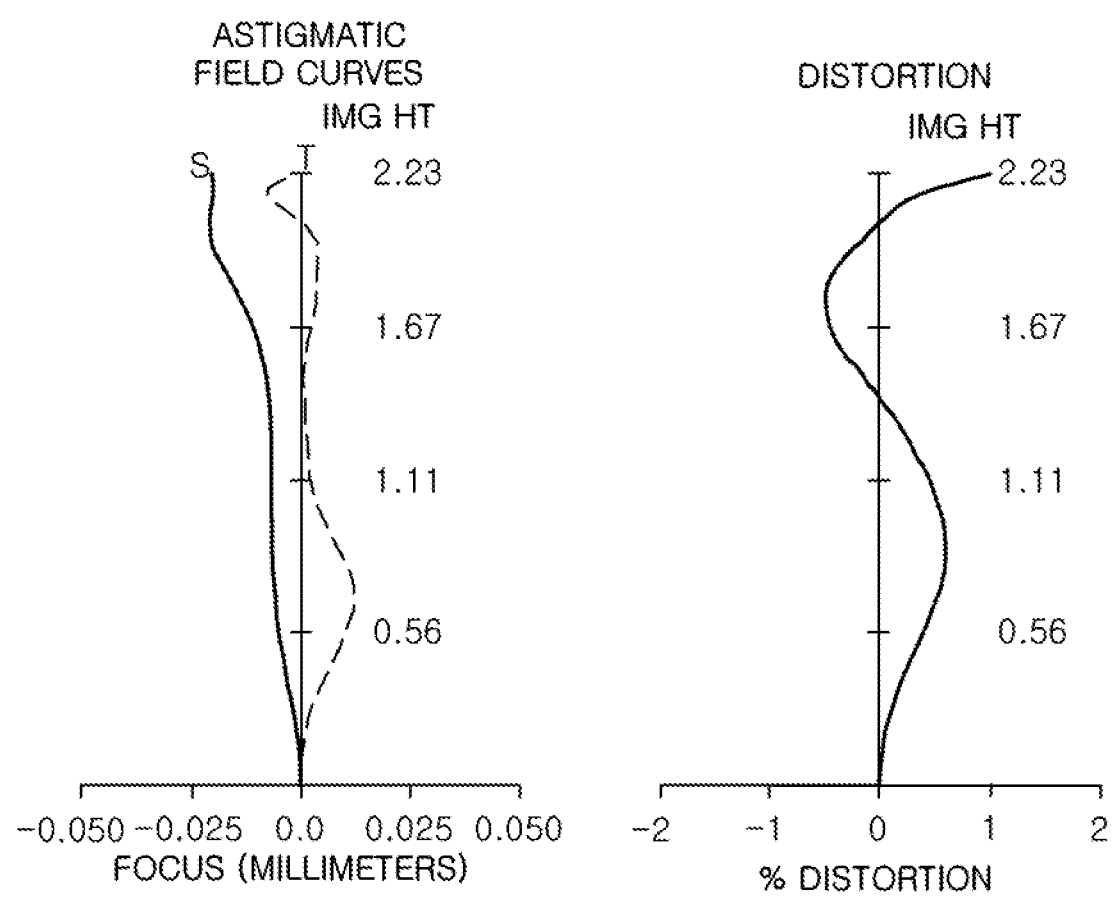
FIG. 2 is graphs having curves which represent aberration characteristics of the lens module of FIG. 1.

FIG. 2 is graphs having curves which represent aberration characteristics of the lens module.

FIG. 3 is a table illustrating the characteristics of lenses configuring the lens module. In FIG. 3, Surface Nos. 1 and 2 indicate the first surface or the object-side surface and the second surface or the image-side surface of the first lens, and Surface Nos. 3 and 4 indicate the first and second surfaces of the second lens. Similarly, Surface Nos. 5 to 10 indicate first and second surfaces of the third to fifth lenses, respectively. In addition, Surface Nos. 11 and 12 indicate first and second surfaces of the infrared cut-off filter.

FIG. 4 is a table representing conic constants and aspheric coefficients of the lenses configuring the lens module. In FIG. 4, the first column of the table indicates Surface Nos. 1 through 10 of respective surfaces of the first to fifth lenses, and K and A to F in the top row of the table indicate conic constants (K) and aspheric coefficients (A to F) of respective surfaces of the lenses.

Figure 5:
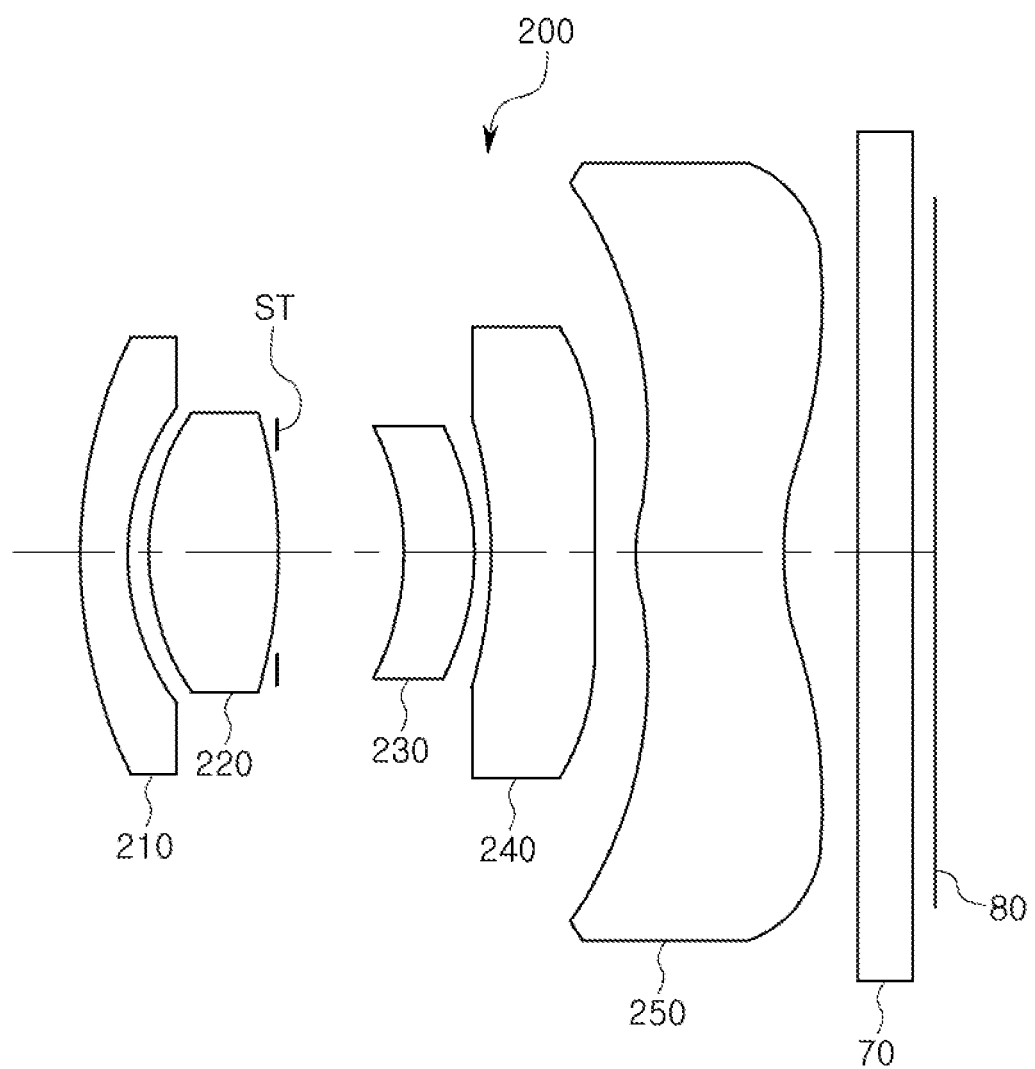
FIG. 5 is a view of a lens module, according to a second embodiment.

A lens module, according to a second embodiment, will be described with reference to FIG. 5.

A lens module 200 has an optical system including a first lens 210, a second lens 220, a third lens 230, a fourth lens 240, and a fifth lens 250. In addition, the lens module 200 includes an infrared cut-off filter 70 and an image sensor 80. In addition, the lens module 200 also includes a stop (ST). For example, the stop is disposed between the second lens and the third lens.

In the embodiment, the first lens 210 has a negative refractive power, and an object-side surface thereof is convex and an image-side surface thereof is concave. The second lens 220 has a positive refractive power, and two opposing surfaces thereof are convex. The third lens 230 has a positive refractive power, and an object-side surface thereof is concave and an image-side surface thereof is convex. The fourth lens 240 has a negative refractive power, and an object-side surface thereof is concave and an image-side surface thereof is concave. The fifth lens 250 has a negative refractive power, and an object-side surface thereof is convex and an image-side surface thereof is concave. In addition, one or more inflection points are formed on each of the object-side surface and the image-side surface of the fifth lens.

In the embodiment, all of the first lens 210, the fourth lens 240, and the fifth lens 250 have a negative refractive power. Among these, the fifth lens 250 has the weakest refractive power, and the first lens 210 has the strongest refractive power. However, a person of skill in the art will appreciate that in alternative embodiments, at least one of the first lens 210, the fourth lens 240, and the fifth lens 150 has a negative refractive power. Also, the refractive power of the first lens 210 may be weaker than the refractive power of the fourth lens 240. Further, the refractive power of the first lens 210 may be weaker than the refractive power of the fifth lens 250.

Figure 6:
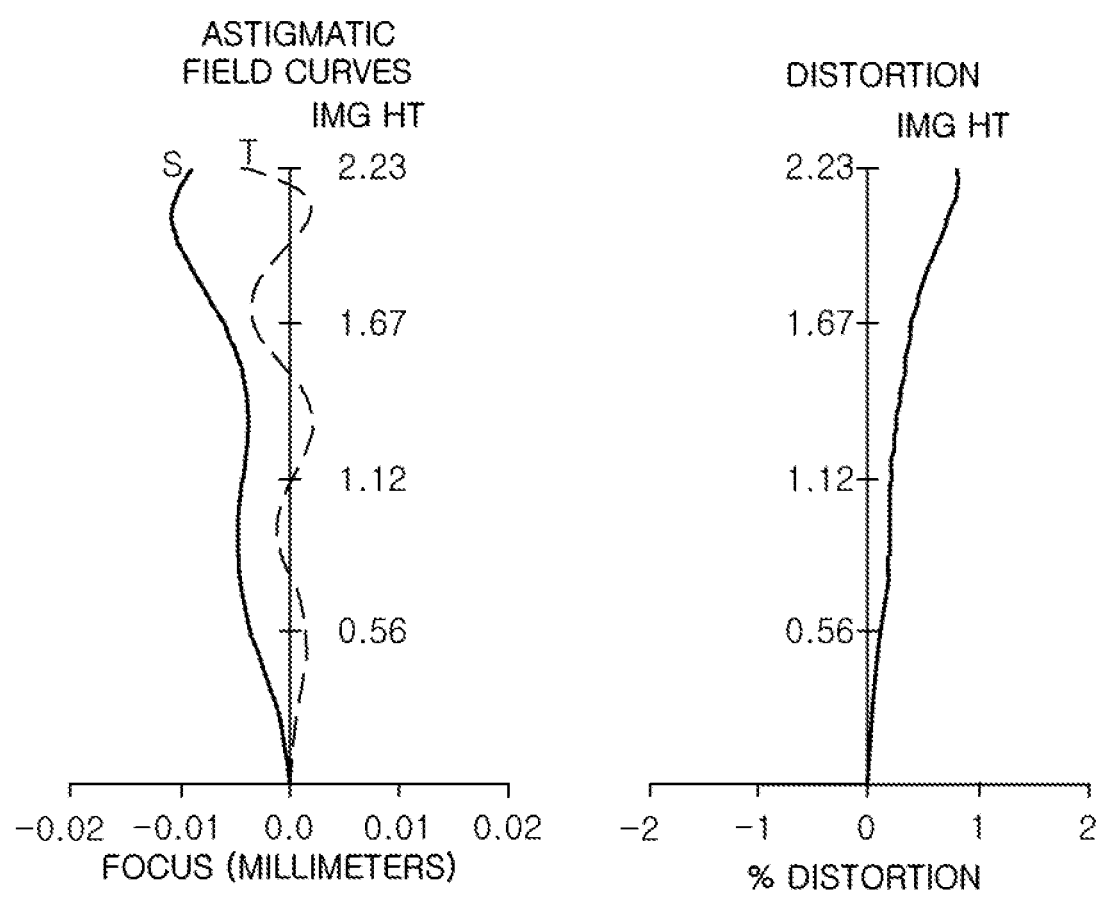
FIG. 6 is graphs having curves which represent aberration characteristics of the lens module of FIG. 5.

FIG. 6 is graphs having curves that represent aberration characteristics of the lens module.

FIG. 7 is a table illustrating the characteristics of lenses configuring the lens module. In FIG. 7, Surface Nos. 1 and 2 indicate the first surface or the object-side surface and the second surface or the image-side surface of the first lens, and Surface Nos. 3 and 4 indicate the first and second surfaces of the second lens. Similarly, Surface Nos. 5 to 10 indicate first and second surfaces of the third to fifth lenses, respectively. In addition, Surface Nos. 11 and 12 indicate first and second surfaces of the infrared cut-off filter.

FIG. 8 is a table representing conic constants and aspheric coefficients of the lenses configuring the lens module. In FIG. 8, the first column of the table indicates Surface Nos. 1 through 10 of respective surfaces of the first to fifth lenses, and K and A to F in the top row of the table indicate conic constants (K) and aspheric coefficients (A to F) of respective surfaces of the lenses.

Figure 9:
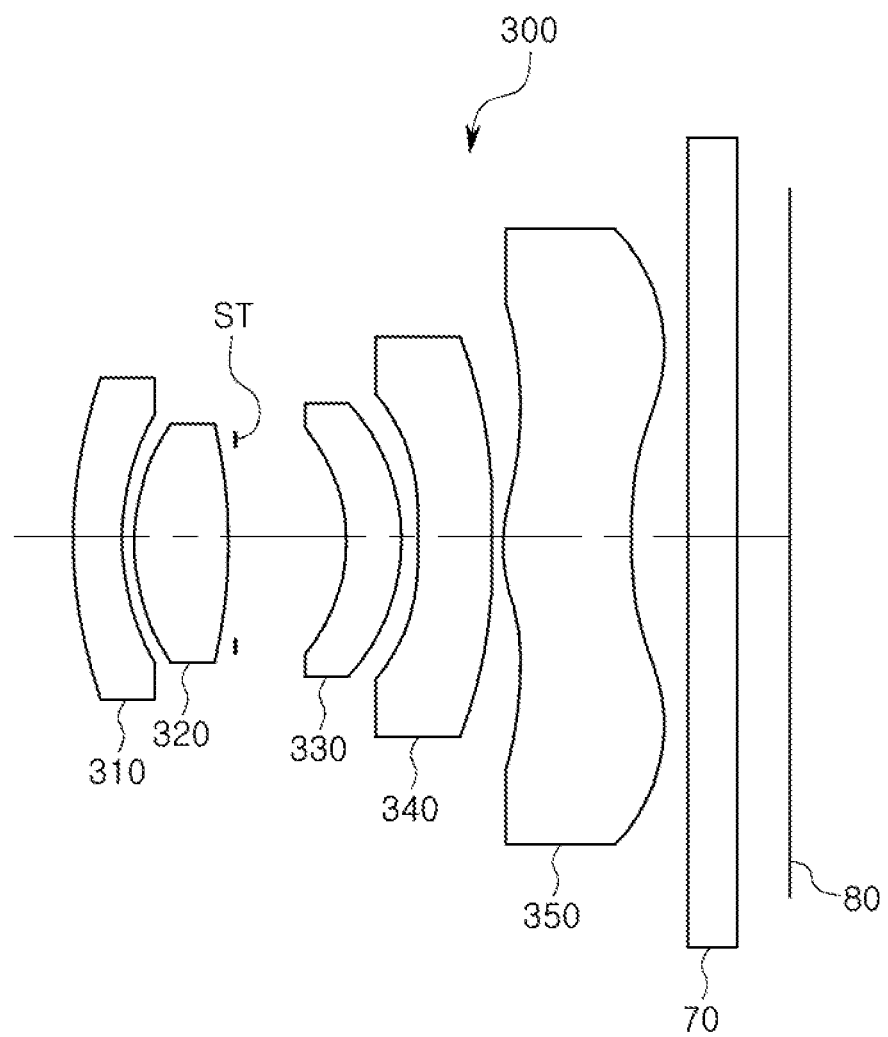
FIG. 9 is a view of a lens module, according to a third embodiment.

A lens module according to a third embodiment will be described with reference to FIG. 9.

A lens module 300 has an optical system including a first lens 310, a second lens 320, a third lens 330, a fourth lens 340, and a fifth lens 350. In addition, the lens module 300 may include an infrared cut-off filter 70 and an image sensor 80. In addition, the lens module 300 further includes a stop (ST). For example, the stop is disposed between the second lens and the third lens.

In the embodiment, the first lens 310 has a negative refractive power, and an object-side surface thereof is convex and an image-side surface thereof is concave. The second lens 320 has a positive refractive power, and two opposing surfaces thereof is convex. The third lens 330 has a positive refractive power, and an object-side surface thereof is concave and an image-side surface thereof is convex. The fourth lens 340 has a negative refractive power, and an object-side surface thereof is concave and an image-side surface thereof is convex. The fifth lens 350 has a positive refractive power, and an object-side surface thereof is convex and an image-side surface thereof is concave. In addition, one or more inflection points are formed on each of the object-side surface and the image-side surface of the fifth lens.

In an embodiment, both of the first lens 310 and the fourth lens 340 have a negative refractive power. In one example, the first lens 310 has a weaker refractive power than that of the fourth lens 340. All of the second lens 320, the third lens 330, and the fifth lens 350 have a positive refractive power. In an example, the second lens 320 has the strongest refractive power and the fifth lens 350 has the weakest refractive power. However, a person of skill in the art will appreciate that in alternative embodiments, at least one of the second lens 320, the fourth lens 340, and the fifth lens 350 has a positive refractive power. Also, the refractive power of the second lens 320 may be weaker than the refractive power of the fifth lens 350.

Figure 10:
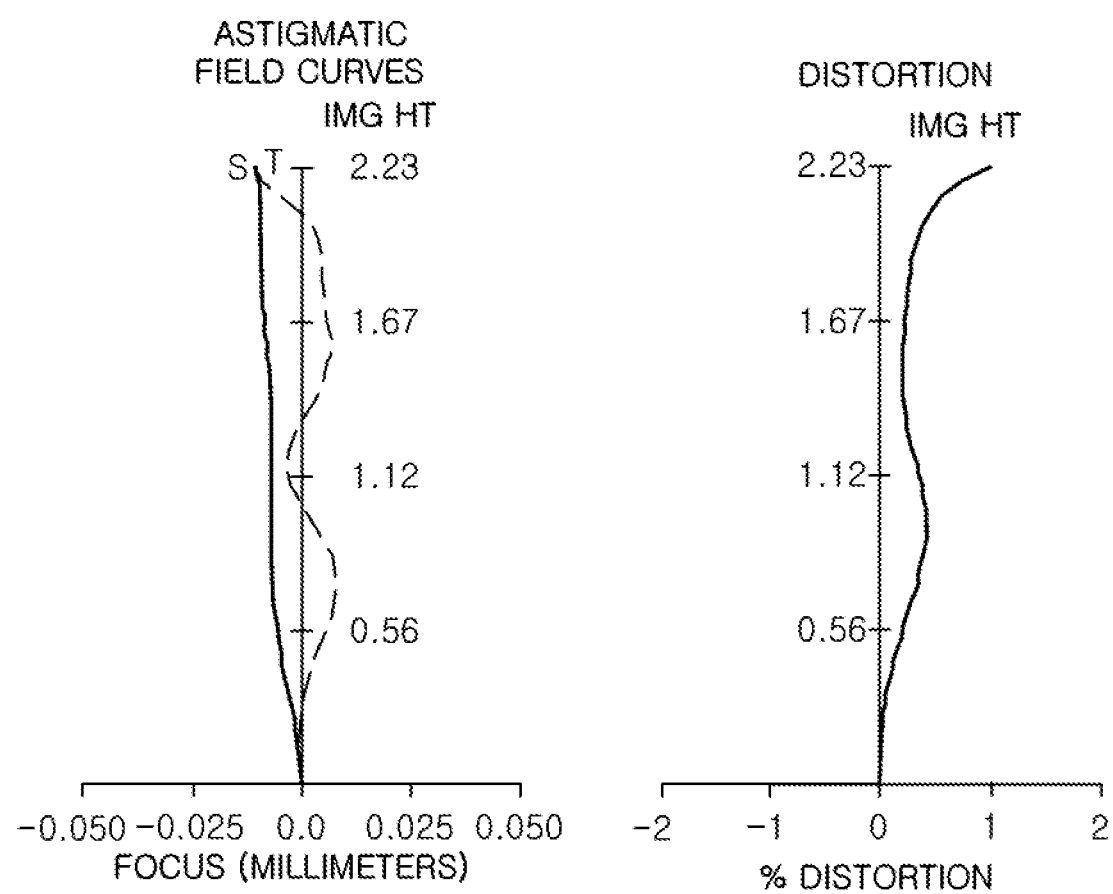
FIG. 10 is graphs having curves which represent aberration characteristics of the lens module of FIG. 9.

FIG. 10 is graphs having curves which represent aberration characteristics of the lens module.

FIG. 11 is a table illustrating the characteristics of the lenses configuring the lens module. In FIG. 11, Surface Nos. 1 and 2 indicate the first surface or the object-side surface and the second surface or the image-side surface of the first lens, and Surface Nos. 3 and 4 indicate the first and second surfaces of the second lens. Similarly, Surface Nos. 5 to 10 indicate first and second surfaces of the third to fifth lenses, respectively. In addition, Surface Nos. 11 and 12 indicate first and second surfaces of the infrared cut-off filter.

FIG. 12 is a table representing conic constants and aspheric coefficients of lenses configuring the lens module. In FIG. 12, the first column of the table indicate Surface Nos. 1 through 10 of respective surfaces of the first to fifth lenses, and K and A to F in the top row of the table indicate conic constants (K) and aspheric coefficients (A to F) of respective surfaces of the lenses.

Figure 13:
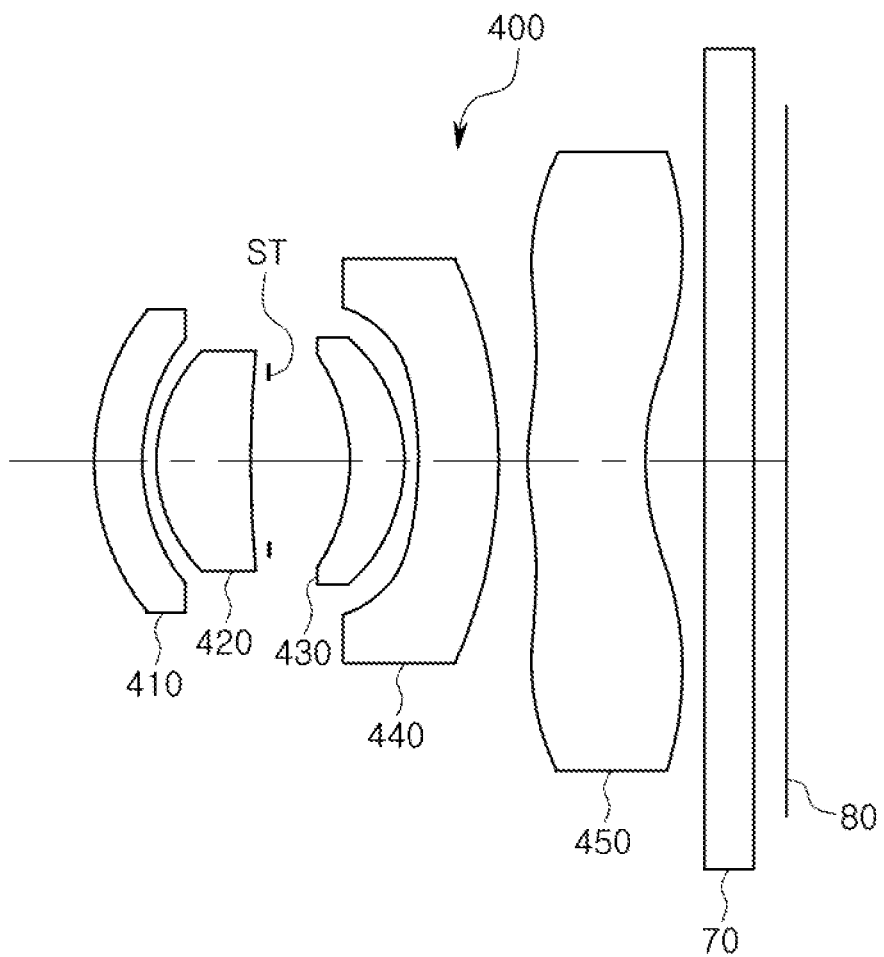
FIG. 13 is a view of a lens module, according to a fourth embodiment.

A lens module, according to a fourth embodiment, will be described with reference to FIG. 13.

A lens module 400 has an optical system including a first lens 410, a second lens 420, a third lens 430, a fourth lens 440, and a fifth lens 450. In addition, the lens module 400 includes an infrared cut-off filter 70 and an image sensor 80. In addition, the lens module 400 further includes a stop (ST). For example, the stop is disposed between the second lens and the third lens.

In the embodiment, the first lens 410 has a negative refractive power, and an object-side surface thereof is convex and an image-side surface thereof is concave. The second lens 420 has a positive refractive power, and an object-side surface thereof is convex and an image-side surface thereof is concave. The third lens 430 has a positive refractive power, and an object-side surface thereof is concave and an image-side surface thereof is convex. The fourth lens 440 has a negative refractive power, and an object-side surface thereof is concave and an image-side surface thereof is convex. The fifth lens 450 has a negative refractive power, and an object-side surface thereof is convex and an image-side surface thereof is concave. In addition, one or more inflection points are formed on each of the object-side surface and the image-side surface of the fifth lens.

In the embodiment, all of the first lens 410, the fourth lens 440, and the fifth lens 450 have a negative refractive power. Among these, the fifth lens 450 has the weakest refractive power, and the first lens 410 has the strongest refractive power. However, a person of skill in the art will appreciate that in alternative embodiments, at least one of the first lens 410, the fourth lens 440, and the fifth lens 450 has a negative refractive power. Also, the refractive power of the first lens 410 may be weaker than the refractive power of the fifth lens 450.

The lens module 400 is formed in such a way that the first lens 410 to the fourth lens 440 are symmetrical to each other in relation to the stop. For example, the first lens 410 has the same refractive power as that of the fourth lens 440, but has an opposite shape to that of the fourth lens 440. For example, the first lens 410 has a meniscus shape convex toward an object, while the fourth lens 440 has a meniscus shape convex toward an image plane. As another example, the second lens 420 has the same refractive power as that of the third lens 430, but has an opposite shape to that of the third lens 430. For example, the second lens 420 has a meniscus shape convex toward an object, while the third lens 430 has a meniscus shape convex toward an image plane.

Figure 14:
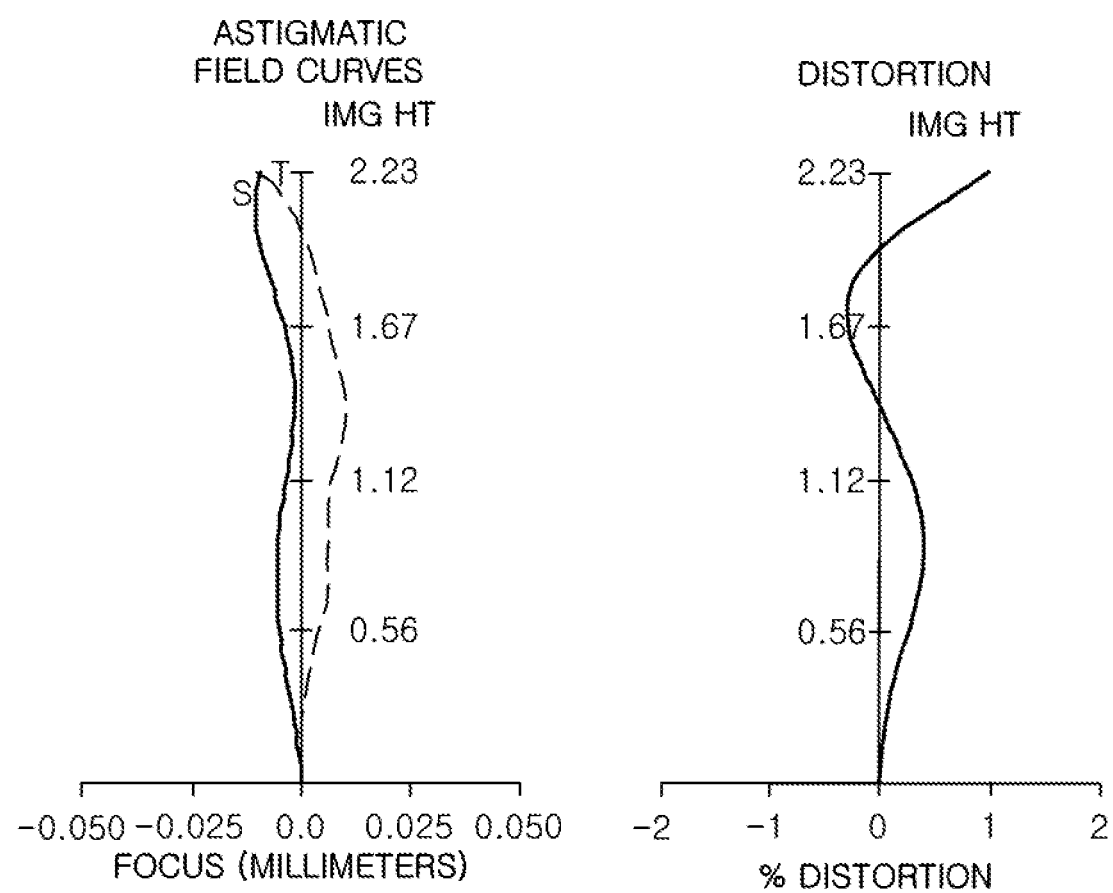
FIG. 14 is graphs having curves which represent aberration characteristics of the lens module of FIG. 13.

FIG. 14 is graphs having curves which represent aberration characteristics of the lens module.

FIG. 15 is a table illustrating the characteristics of the lenses configuring the lens module. In FIG. 15, Surface Nos. 1 and 2 indicate the first surface or the object-side surface and the second surface or the image-side surface of the first lens, and Surface Nos. 3 and 4 indicate the first and second surfaces of the second lens. Similarly, Surface Nos. 5 to 10 indicate first and second surfaces of the third to fifth lenses, respectively. In addition, Surface Nos. 11 and 12 indicate first and second surfaces of the infrared cut-off filter.

FIG. 16 is a table representing conic constants and aspheric coefficients of the lenses configuring the lens module. In FIG. 16, the first column of the table indicates Surface Nos. 1 through 10 of respective surfaces of the first to fifth lenses, and K and A to F in the top row of the table indicate conic constants (K) and aspheric coefficients (A to F) of respective surfaces of the lenses.

Table 1 below illustrates optical characteristics of a lens module, according to the first to fourth embodiments. The lens module has an overall focal length f of approximately 2.80 to 3.70. A focal length f1 of the first lens of the lens module is determined to be in the range of approximately −6.0 to −5.0. A focal length f2 of the second lens of the lens module is determined to be in the range of approximately 1.60 to 2.10. A focal length f3 of the third lens of the lens module is determined to be in the range of approximately 5.0 to 17.0. A focal length f4 of the fourth lens of the lens module is determined to be in the range of approximately −7.0 to −4.0. A focal length f5 of the fifth lens of the lens module is determined to be approximately −15.0 or greater. An overall length TTL of an optical system of the lens module is determined to be in the range of approximately 4.20 to 4.80. A field of view FOV of the lens module is determined to be in the range of approximately 60.0 to 80.0.

TABLE 1

| Remark | First embodiment | Second embodiment | Third embodiment | Fourth embodiment |
|---|---|---|---|---|
| f | 2.914 | 3.600 | 3.491 | 3.402 |
| f1 | −5.405 | −5.829 | −5.898 | −5.538 |
| f2 | 1.757 | 1.914 | 1.944 | 1.855 |
| f3 | 5.943 | 15.867 | 12.495 | 7.641 |
| f4 | −6.530 | −6.589 | −4.711 | −5.543 |
| f5 | −8.731 | −9.221 | 144.824 | −13.822 |
| TTL | 4.316 | 4.726 | 4.622 | 4.427 |
| FOV | 74.85 | 63.55 | 65.14 | 66.49 |
| ImgH | 2.230 | 2.230 | 2.230 | 2.230 |

Table 2 below shows values of the conditional formulas 1 to 5 of the lens modules, according to the first to fourth embodiments.

TABLE 2

| Conditional Formula | First embodiment | Second embodiment | Third embodiment | Fourth embodiment |
|---|---|---|---|---|
| $|V1 - V2|$ | 30.70 | 30.70 | 30.70 | 30.70 |
| $V3 - V4$ | 30.70 | 30.70 | 30.70 | 30.70 |
| $|(1/f1 + 1/f2)/(1/f3 + 1/f4 + 1/f5)|$ | 3.864 | 1.780 | 2.751 | 2.941 |
| $|(r1 + r2)/(r5 + r6)|$ | 2.479 | 1.381 | 1.943 | 1.242 |
| $d3/d4$ | 0.857 | 1.021 | 0.769 | 1.087 |

As seen from Table 2 above, the lens modules, according to the first to fourth embodiments, satisfy all of the conditional formulas 1 to 5.

As set forth above, according to embodiments, a high-resolution optical system may be realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
    a first lens having a refractive power;
    a second lens having a positive refractive power;
    a third lens having a positive refractive power;
    a fourth lens having a refractive power; and
    a fifth lens having a positive refractive power,
    wherein the first to fifth lenses are sequentially arranged in ascending numerical order from an object side of the lens module toward an image side of the lens module,
    the refractive power of the first lens is stronger than the refractive power of the fourth lens, and
    a shape of the fourth lens is symmetrical to a shape of the first lens.

2. The lens module of claim 1, wherein the first lens has a meniscus shape convex toward the image side of the lens module, and
    the third lens has a meniscus shape convex toward the object side of the lens module.

3. The lens module of claim 1, wherein an object-side surface of the first lens is convex, and an image-side surface of the fourth lens is convex.

4. The lens module of claim 1, wherein an image-side surface of the first lens is concave, and an object-side surface of the fourth lens is concave.

5. The lens module of claim 1, wherein the first lens has a convex object-side surface, and the third lens has a convex image-side surface.

6. The lens module of claim 1, wherein the lens module satisfies $1.0<|(1/f1+1/f2)/(1/f3+1/f4+1/f5)|<4.0$, where f1 is a focal length of the first lens, f2 is a focal length of the second lens, f3 is a focal length of the third lens, f4 is a focal length of the fourth lens, and f5 is a focal length of the fifth lens.

7. The lens module of claim 1, wherein the lens module satisfies $1.0<|(r1+r2)/(r5+r6)|<3.0$, where r1 is a radius of curvature of an object-side surface of the first lens, r2 is a radius of curvature of an image-side surface of the first lens, r5 is a radius of curvature of an object-side surface of the third lens, and r6 is a radius of curvature of an image-side surface of the third lens.

8. The lens module of claim 1, wherein the first lens and the fourth lens have a negative refractive power.

\* \* \* \* \*